United States Patent
Miyamori et al.

(12) 
(10) Patent No.: US 6,245,845 B1
(45) Date of Patent: Jun. 12, 2001

(54) FLUORINE-CONTAINING RESIN COMPOSITION FOR PARTS OF ELECTRONIC AND ELECTRICAL EQUIPMENT AND SAME PARTS

(75) Inventors: Tsuyoshi Miyamori; Masaji Komori; Takuya Arase, all of Settsu (JP)

(73) Assignee: Daikin Industries, Inc., Osaka (JP)

( * ) Notice: Subject to any disclaimer, the term of this patent is extended or adjusted under 35 U.S.C. 154(b) by 0 days.

(21) Appl. No.: 09/433,371

(22) Filed: Nov. 3, 1999

(30) Foreign Application Priority Data

Nov. 5, 1998  (JP) .................................................. 10-314800

(51) Int. Cl.⁷ ................................ C08K 3/38; C08K 5/02
(52) U.S. Cl. ........................ 524/404; 524/463; 523/201; 523/206
(58) Field of Search ................................... 523/201, 206, 523/212, 213; 524/404, 463

(56) References Cited

U.S. PATENT DOCUMENTS

| | | | |
|---|---|---|---|
| 5,506,049 | * | 4/1996 | Swei et al. ............................ 428/323 |
| 5,922,453 | * | 7/1999 | Horn, III et al. ..................... 428/325 |

FOREIGN PATENT DOCUMENTS

| | | |
|---|---|---|
| 7-118529 | 5/1995 | (JP) . |
| 8-59992 | 3/1996 | (JP) . |
| 8-134263 | 5/1996 | (JP) . |

* cited by examiner

*Primary Examiner*—Tae H. Yoon
(74) *Attorney, Agent, or Firm*—Armstrong, Westerman, Hattori, McLeland & Naughton, LLP

(57) ABSTRACT

To provide a fluorine-containing resin composition useful as a molding material for parts of electronic and electrical equipment which assures well-balanced enhancement of dielectric property, heat resistance, mold-processability (precise processability) and mechanical properties and the parts of electronic and electrical equipment. The fluorine-containing resin composition for parts of electronic and electrical equipment comprises 70 to 95% by weight of (I) fluorine-containing resin mixture comprising (a) a fluorine-containing resin containing polytetrafluoroethylene not to be fibrillated and (b) a thermoplastic resin other than the fluorine-containing resin and 5 to 30% by weight of (II) a metal compound whisker having a single bond strength of not less than 190 KJ/mol calculated from a dissociation energy of bond between a metal element and oxygen. The parts of electronic and electrical equipment which are obtained from the composition have a dielectric constant of not more than 3.5.

18 Claims, 1 Drawing Sheet

FLUORINE-CONTAINING RESIN COMPOSITION FOR PARTS OF ELECTRONIC AND ELECTRICAL EQUIPMENT AND SAME PARTS

BACKGROUND OF THE INVENTION

The present invention relates to resin parts of electronic and electrical equipment, particularly resin parts of electronic and electrical equipment using a high frequency wave and to a fluorine-containing resin composition suitable as a molding material for the resin parts.

PRIOR ART

A lot of parts made of resins are used on electronic and electrical equipment. Some of molding materials for those resin parts are selected simply from the viewpoint of mold-processability. However as a result of making performance higher, down-sizing, high integration and high densification of electronic and electrical equipment, severe demands for precise processability, electronic and electrical characteristics, heat resistance, etc. have been increasing. Particularly with respect to information processing and communications equipment, a frequency band used therefor are transferring to a high frequency band. For example, for parts such as a printed circuit board, connector, insulating material (for example, an antenna built in a housing of portable phone, etc.), high frequency filter, high frequency antenna and microwave range, excellent electric insulating property and dielectric property in addition to precise processability, mechanical properties and thermal characteristics have been required. Among them with respect to dielectric property which is related to a dielectric loss in electronic and electrical equipment using a high frequency wave, a dielectric constant and dissipation factor are required to be as low as possible.

However with respect to general-purpose engineering plastics being excellent in moldability, there is a tendency that those having more excellent heat resistance are high in dielectric constant and dissipation factor.

As a result of down-sizing, high integration and high densification, enhancement of dimensional stability of resin parts has been demanded. To cope with such a demand, various fillers are added to the resin. However there is a case where the addition of the fillers lowers not only mold-processability but also dielectric property.

For example, JP-A-7-118529 discloses a resin composition for electronic parts which is prepared by using, as a matrix resin, a thermoplastic resin comprising polyetherimide, polyphenylene ether and aromatic vinyl resin and adding thereto 5 to 60% by weight of aluminum borate whisker or magnesium borate whisker. Also JP-A-8-59992 discloses a resin composition for high frequency electronic parts which is prepared by using, as a matrix resin, a thermoplastic resin comprising polyetherimide, polyphenylene ether and aromatic vinyl resin and adding thereto a silicate fiber such as wallastonite, xonotlite, mullite, zinc silicate, sepiolite or chrysotile.

Further JP-A-8-134263 discloses a resin composition for high frequency electronic parts which is prepared by using, as a matrix resin, a thermoplastic resin (excluding polyamide resin) or a thermosetting resin (excluding a phenolic resin) and adding thereto 5 to 60% by weight of a reinforcing fiber mainly comprising a fibrous substance of the specific metal silicate. That resin composition is suitable as a material for printed circuit boards for high frequency and has a low dielectric constant, low dissipation factor, high heat resistance, high mechanical strength and good heat conductivity.

However in the resin compositions disclosed in JP-A-7-118529 and JP-A-8-59992, since the matrix resin is prepared by combining amorphous resins, mold-processability thereof is poor and dipping in a soldering bath at a temperature exceeding 260° C. for a long period of time cannot be conducted, and in addition, heat resistance (deflection temperature under load or heat distortion temperature) of an obtained molded article is up to 210° C.

Also though JP-A-8-134263 suggests use of fluorine-containing meltable resin solely or combination use of fluorine-containing meltable resin with other resin as a matrix resin in a resin composition, it does not teach concretely not only components of the composition but also use of polytetrafluoroethylene (PTFE) (PTFE is a fluorine-containing resin which is not melt-processable) which is represented by a low molecular weight PTFE and is not fibrillated. Also with respect to an obtained molded article, when its dielectric constant is decreased to 3.5 or lower, its heat resistance (deflection temperature under load) is lowered and when its heat resistance is intended to be enhanced, its dielectric constant exceeds 3.5.

Thus molded articles having well-balanced enhanced characteristics such as dielectric property, heat resistance, mold-processability (precise processability) and mechanical properties have not been found out.

The present inventors have made intensive studies with respect to use of a fluorine-containing resin as a molding material for electronic and electrical parts which had been left unused since it is poor in melt-processability while its dielectric constant is low, and as a result, have found that a fluorine-containing resin composition comprising (I) a fluorine-containing resin mixture of (a) a fluorine-containing resin containing PTFE not to be fibrillated among PTFE which are not melt-processable and (b) a thermoplastic resin other than the fluorine-containing resin and (II) a specific whisker can unexpectedly have well-balanced enhanced characteristics such as dielectric property, heat resistance, mold-processability (precise processability) and mechanical properties. Thus the present invention has been completed.

SUMMARY OF THE INVENTION

Namely the present invention relates to the fluorine-containing resin composition for parts of electronic and electrical equipment which comprises 70 to 95% by weight of (I) fluorine-containing resin mixture comprising (a) a fluorine-containing resin containing PTFE not to be fibrillated and (b) a thermoplastic resin other than the fluorine-containing resin and 5 to 30% by weight of (II) a metal compound whisker having a single bond strength of not less than 190 KJ/mol calculated from a dissociation energy of bond between a metal element and oxygen.

Further the present invention relates to parts of electronic and electrical equipment which are molded articles comprising the thermoplastic resin (b) as a matrix resin and the fluorine-containing resin (a) and the whisker (II) being dispersed uniformly in the matrix resin, and a dielectric constant of the whole molded article is not more than 3.5, preferably not more than 3.0.

DETAILED DESCRIPTION

Figure 1:
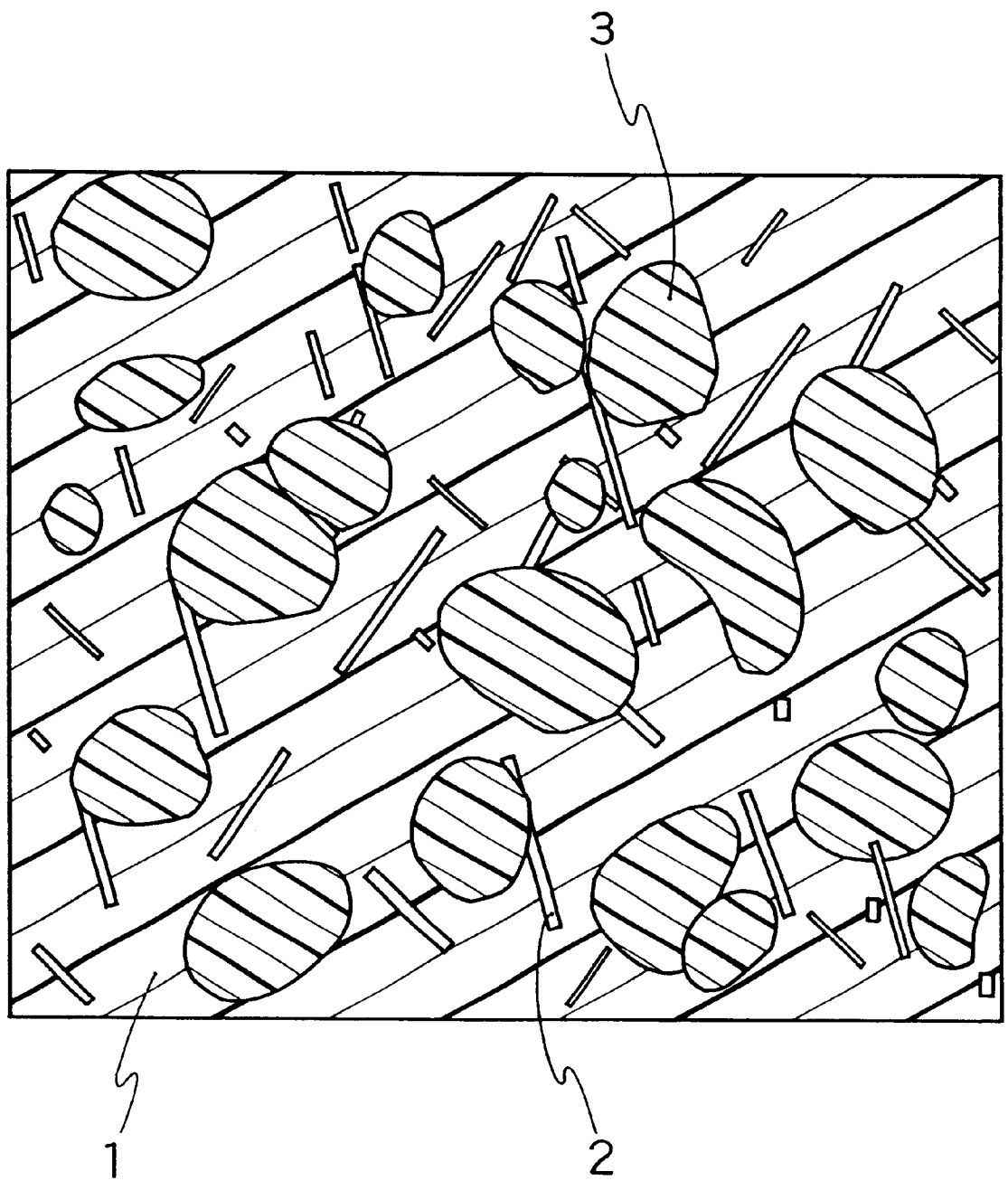
FIG. 1 is a diagrammatic view for explaining a state inside a molded article obtained from the resin composition of the present invention.

The fluorine-containing resin (a) blended to the composition of the present invention is a fluorine-containing resin containing PTFE not to be fibrillated. The fluorine-containing resin (a) may comprise only PTFE not to be fibrillated or a mixture of PTFE not to be fibrillated and other fluorine-containing meltable resin.

Examples of PTFE not to be fibrillated are a particle of low molecular weight PTFE or a particle of core-shell structure comprising a low molecular weight PTFE as a shell and a high molecular weight PTFE as a core (JP-A-4-154842). To be fibrillated means a phenomenon of PTFE rubbing against each other or rubbing with other material to be in the form of fiber (fibril). This is recognized as a characteristic of a high molecular weight PTFE. Therefore a low molecular weight PTFE can be discriminated from a high molecular weight PTFE from the point that the former PTFE is not fibrillated. It may be daringly said that a low molecular weight PTFE is one having a melt viscosity of not more than $10^7$ poises at 380° C. Irrespective of a low molecular weight PTFE or a high molecular weight PTFE, though a dielectric constant (1 MHz) of PTFE is as low as 2.1, PTFE is a resin which cannot be molded by melt-molding methods, for example, melt-extrusion molding and injection molding. In addition, since PTFE is a resin having a low modulus of elasticity and a high coefficient of linear expansion at high temperature range, it has been considered not suitable as a molding material for a molded article requiring moldability, particularly precise moldability and dimensional stability against heat (For example, JP-A-8-134263 discloses only a heat-melting fluorine-containing resin.).

Examples of the other fluorine-containing resin which may be blended together with PTFE to the fluorine-containing resin (a) are fluorine-containing resins having melt-moldability. For example, there are homopolymers (excluding PTFE) or copolymers of perfluoro monomers such as tetrafluoroethylene (TFE), hexafluoropropylene (HFP), perfluoro(alkyl vinyl ether) (PAVE) represented by the formula: $CF_2=CF-O-R_f$, in which $R_f$ is a perfluoroalkyl group having 1 to 10 carbon atoms, perfluoro (alkylethylene) represented by the formula: $CF_2=CF-R_f$, in which $R_f$ is a perfluoroalkyl group having 2 to 10 carbon atoms, perfluoro(alkyl allyl ether) represented by the formula: $CF_2=CF-CF_2-O-R_f$, in which $R_f$ is a perfluoroalkyl group having 1 to 10 carbon atoms, perfluoro compounds represented by the formula $CF_2=CF-[OCF_2CF(CF_3)]_n-O-CF_2(CF_2)_pY$, in which Y is a halogen atom, n is 0 or an integer of 1 to 5, p is 0 or an integer of 1 to 2; and non-perfluoro fluorine-containing monomers such as chlorotrifluoroethylene (CTFE) and vinylidene fluoride (VdF). Further copolymers comprising at least one of those fluorine-containing monomers and a non-fluorine-containing monomer such as ethylene can be used if they are heat-meltable.

Examples thereof are, for instance, at least one or a mixture of two or more of TFE-HFP copolymer (FEP, preferably containing 1 to 20% by weight of HFP), TFE-PAVE copolymer (PFA, preferably containing 1 to 8% by weight of PAVE), ethylene-TFE copolymer (ETFE, preferably containing 10 to 26% by weight of ethylene), vinylidene fluoride (VdF) homopolymer (PVdF), chlorotrifluoroethylene (CTFE) homopolymer (PCTFE) and the like. Those polymers may be fluorine-containing resins having functional group which can be obtained by copolymerizing a fluorine-containing ethylenic monomer having at least one of functional groups such as hydroxyl, carboxyl, carboxylic salt group, carboxylic ester group and epoxy in an amount of 0.05 to 30% by mole on the basis of the whole monomers.

Among those fluorine-containing meltable resins, FEP, PFA and PCTFE which have a dielectric constant (1 MHz) of not more than 2.5 are preferred, and particularly preferable are FEP and PCTFE having a dielectric constant (1 MHz) of 2.1 which is nearly the same as that of PTFE.

An adding amount of the fluorine-containing meltable resin is, for example, from 1 to 400 parts by weight (hereinafter referred to as "part"), preferably from 10 to 200 parts based on 100 parts of PTFE not to be fibrillated from the viewpoint of melt-flowability.

In the present invention, the thermoplastic resin (b) other than the fluorine-containing resin (a) forms a matrix of a molded article. Since the thermoplastic resin (b) functions to enhance melt-moldability of the composition, it is preferable that the melt flowability (melt flow rate: MFR) is as high as possible at a molding temperature.

The thermoplastic resin (b) may be selected optionally from various general-purpose engineering plastics depending on application and required performance, for example, durability. In that case it is preferable that from the point of not lowering dielectric property of the fluorine-containing resin (a), a dielectric constant (1 MHz) of the resin (b) is as low as possible, particularly preferably not more than 3.5. Examples of the thermoplastic resin having a dielectric constant (1 MHz) of not more than 3.5 are, for instance, polyarylene sulfide (for example, polyphenylene sulfide (PPS)), polyether ether ketone (PEEK), polyimide (PI), polyetherimide (PEI), polyamide imide (PAI), modified polyphenylene ether (PPE), polyalylate (PAR), polysulphone (PSU), liquid crystal polymer (LCP), polycarbonate (PC), polyethylene (PE), polypropylene (PP), polystyrene (PSt), and the like. In case of further enhancing heat resistance, resins having higher melting point and higher melt-flowability are preferred, for example, PPS, PEEK, PEI, PAI and PI. PPS is excellent in precise processability, PEEK is excellent in fatigue resistance, PEI is excellent in environmental capability, PAI is excellent in stress crack resistance, and PI is excellent in heat resistance. Those thermoplastic resins may be used solely or in a mixture of two or more thereof.

In the present invention, the fluorine-containing resin mixture (I) comprises the fluorine-containing resin (a) and the thermoplastic resin (b). An amount of the thermoplastic resin (b) is from 60 to 110 parts, preferably from 60 to 100 parts, further preferably from 80 to 100 parts based on 100 parts of the fluorine-containing resin (a). If the amount of the thermoplastic resin (b) is too much, an effect of the fluorine-containing resin is lowered, for example, an effect of decreasing the dielectric constant is lowered, and if the amount is too small, moldability becomes poor.

The composition of the present invention further contains a specific whisker (II) as a reinforcing material. That specific whisker has a role to provide a molded article with mechanical strength such as tensile strength and bending strength, and resistance to thermal deformation and thermal dimensional stability such as deflection temperature under load and thermal expansion without lowering dielectric property of the composition (molded article). If simply mechanical strength and dielectric property are given to the fluorine-containing resin mixture (I) of the present invention, it can be attained to a certain extent by blending a glass fiber such as E glass or T glass which has been used hitherto or a fibrous substance of metal silicate disclosed in JP-A-8-59992 and JP-A-8-134263. However known fibrous substances are not enough from the point of not lowering resistance to thermal deformation and moldability of the fluorine-containing resin mixture, particularly precise processability and surface smoothness. Thus it is necessary to blend the whisker.

The whisker (II) used in the present invention is a whisker of metal compound having a single bond strength (value obtained by dividing a dissociation energy of bond between a metal element and oxygen by a coordination number of the metal element, hereinafter referred to as "single bond strength") of not less than 190 KJ/mol calculated from a dissociation energy of bond between a metal element and oxygen. If the single bond strength is larger, in general a dielectric loss when a high frequency wave is applied tends to decrease. Examples of the metal element having a single bond strength of not less than 190 KJ/mol are silicon (199 KJ/mol) and boron (267 KJ/mol), and other metal elements such as phosphorus (149 KJ/mol), vanadium (152 KJ/mol), aluminum (126 KJ/mol), zirconium (126 KJ/mol) and lead (186 KJ/mol) may be employed. Examples of the whisker which is a needle monocrystal containing such a metal element are, for instance, aluminum borate whisker, silicon carbide whisker, aluminum oxide whisker, silicon nitride whisker, boron nitride whisker, and in addition a whisker containing metal element other than those mentioned above, for example, magnesium borate whisker. A potassium titanate whisker is another typical whisker, in which titanium has a single bond strength of 110 KJ/mol and there is a functioning of increasing a dielectric constant. Thus an effect of the present invention cannot be obtained.

From the viewpoint of enhancing dielectric property which is one of the objects of the present invention, the dielectric constant (1 MHz) of the whisker (II) is less than 7.0 (namely lower than the dielectric constant of E glass), preferably not more than 6.0. The whisker meeting such requirement is an aluminum borate whisker (dielectric constant: 5.6).

In order to enhance interface adhesion of the whisker with the thermoplastic resin matrix, various coupling agents may be added or the whisker may be previously treated with a coupling agent. Examples of the coupling agent are, for instance, amino silane coupling agents such as γ-aminopropyltriethoxysilane, m- or p-aminophenyltriethoxysilane, β-ureidopropyltriethoxysilane, N-(β-aminoethyl)-γ-aminopropyltrimethoxysilane and N-(β-aminoethyl)-γ-aminopropylmethyldimethoxysilane; organic silane compounds such as phenyltrimethoxysilane, phenyltriethoxysilane, p-chlorophenyltrimethoxysilane, p-bromophenyltrimethoxysilane, diphenyldimethoxysilane, diphenyldiethoxysilane and diphenylsilanediol; and the like.

An adding amount of the whisker (II) is from 5 to 30% by weight, preferably from 5 to 15% by weight based on the sum of the fluorine-containing resin mixture (I) and the whisker (II). When the amount is too small, each strength and dimensional stability required cannot be obtained. When too much, dielectric constant of the whole molded article becomes large and anisotropy at molding appears significantly, thus lowering moldability, particularly precise moldability and surface smoothness.

To the fluorine-containing resin composition of the present invention may be added various additives as far as a desired effect of the present invention is not lowered. Examples of the additives are, for instance, one or two or more of known antioxidant, thermal stabilizer, ultraviolet ray absorbing agent, lubricant, mold-release agent, dye, pigment, flame retarder, auxiliary for flame retarder, antistatic agent and the like.

The fluorine-containing resin composition of the present invention can be prepared by mixing the fluorine-containing resin mixture (I) comprising the fluorine-containing resin (a) containing PTFE not to be fibrillated and the thermoplastic resin (b),the whisker (II) and if necessary, various additives. The mixing method is not particularly limited. There may be used a method comprising pre-mixing the fluorine-containing resin (a) and the thermoplastic resin (b) with a mixer or a tumbler to give the fluorine-containing resin mixture (I), adding the whisker (II) and melt-kneading with a two screw extruder or the like. Also a method of mixing a batch of the whole components and melt-kneading may be employed.

The fluorine-containing resin composition of the present invention is melt-molded to give molded articles being excellent in dielectric property, mechanical strength, dimensional stability and surface smoothness, particularly molded articles suitable as parts of electronic and electrical equipment. Namely the present invention relates to parts of electronic and electrical equipment which are obtained from the molded articles, in which the thermoplastic resin (b) forms a matrix, the fluorine-containing resin (a) containing PTFE not to be fibrillated, the whisker (II) and as case demands, various additives are uniformly dispersed in the matrix, and a dielectric constant of the whole molded article is not more than 3.5, preferably not more than 3.0.

In the molded articles providing parts of the present invention, as shown in FIG. 1 for explaining a state inside the molded article, the thermoplastic resin (b) other than the fluorine-containing resin (a) forms a matrix 1, and the whisker 2 and the fluorine-containing resin (a), particularly PTFE 3 not to be fibrillated are dispersed in the matrix. In a point that the fibrous substances such as the whiskers are dispersed in the matrix of thermoplastic resin (b), the present invention is the same as the above-mentioned prior art, but is basically different from the prior art in a point that the fluorine-containing resin (a), particularly PTFE 3 not to be fibrillated exists as a substance in a state of being dispersed uniformly but not as a matrix. Also since an amount of the whisker 2 is from 5 to 30% by weight based on the composition, the molded articles have characteristics, for example, mechanical properties, particularly coefficient of linear expansion and deflection temperature under load to cope with post-processing (plating, soldering and making through-holes) required for parts of electronic and electrical equipment.

It is preferable that the parts of the present invention have a coefficient of linear expansion of $2\times10^{-5}/°$ C. to $3\times10^{-5}/°$ C. which is equivalent to that of copper or aluminum to be contacted to or adhered to the molded article at post-processing.

Also it is preferable that the deflection temperature under load of the parts is not less than 150° C., particularly preferably not less than 200° C. in order to minimize deformation of the parts at various heat-treating processes, for example, soldering.

When an adding amount of the whisker is 5 to 15% by weight, a dielectric constant of the whole molded article can be reduced to 3.0 or lower.

To the resin composition of the present invention can be applied various molding methods, for example, melt-processing such as extrusion molding and injection molding, compression molding, etc. Particularly in case of the injection molding capable of precise molding, it is possible to produce a molded article having a sharp edge and smooth surface. Conditions for the injection molding may be the same as conventional ones. For example, a cylinder temperature of an injection molding machine may be set at about 200° to about 400° C., and a mold die temperature thereof may be set at about 100° to about 200° C. Also a mother molded article may be produced by compression molding or extrusion molding and then machined.

Then mentioned below are preferred compositions and molded articles of the present invention. However the present invention is not limited to them.

(1) (I) Fluorine-containing resin mixture 70 to 95% by weight
  (a) Fluorine-containing resin
    Low molecular weight PTFE only or a mixture of low molecular weight PTFE and other fluorine-containing resin
    Dielectric constant $\epsilon$: 2.5 or lower
  (b) Thermoplastic resin
    Dielectric constant $\epsilon$: 3.5 or lower
    (a)/(b)=100/60 to 100/110 (weight ratio)
  (II) Specific whisker 5 to 30% by weight
  Dielectric constant $\epsilon$: Lower than 7
  (III) Molded article
  Dielectric constant $\epsilon$: 3.5 or lower
  Coefficient of linear expansion: $2\times10^{-5}$/° C. to $3\times10^{-5}$/° C.
  Deflection temperature under load: 150° C. or higher
  (IV) Effect
  Low dielectric constant and excellent heat resistance. Various molding methods can be employed.
  (V) Application
  Parts of various electronic and electrical equipment (2) (I) Fluorine-containing resin mixture 85 to 95% by weight
  (a) Fluorine-containing resin
    Low molecular weight PTFE only or a mixture of low molecular weight PTFE and other fluorine-containing resin
    Dielectric constant $\epsilon$: 2.2 or lower
  (b) Thermoplastic resin
    Dielectric constant $\epsilon$: 3.5 or lower
    (a)/(b)=100/60 to 100/110 (weight ratio)
  (II) Specific whisker 5 to 15% by weight
  Dielectric constant $\epsilon$: 6 or lower
  (III) Molded article
  Dielectric constant $\epsilon$: 3.0 or lower
  Coefficient of linear expansion: $2\times10^{-5}$/° C. to $3\times10^{-5}$/° C.
  Deflection temperature under load: 150° C. or higher
  (IV) Effect
  Low dielectric constant and excellent heat resistance. Various molding methods can be employed. Particularly precise molding is possible and smooth surface can be obtained.
  (V) Application
  Parts of various electronic and electrical equipment (3) (I) Fluorine-containing resin mixture 70 to 85% by weight
  (a) Fluorine-containing resin
    Low molecular weight PTFE only or a mixture of low molecular weight PTFE and other fluorine-containing resin
    Dielectric constant $\epsilon$: 2.5 or lower
  (b) Thermoplastic resin
    Dielectric constant $\epsilon$: 3.5 or lower
    (a)/(b)=100/60 to 100/110 (weight ratio)
  (II) Specific whisker 15 to 30% by weight
  Dielectric constant $\epsilon$: Lower than 7
  (III) Molded article
  Dielectric constant $\epsilon$: 3.5 or lower
  Coefficient of linear expansion: $2\times10^{-5}$/° C. to $3\times10^{-5}$/° C.
  Deflection temperature under load: 200° C. or higher
  (IV) Effect
  Low dielectric constant and excellent heat resistance. The molded article has particularly high heat resisting temperature and deflection temperature under load. Also various molding methods can be employed.
  (V) Application
  Parts of various electronic and electrical equipment which are required to be post-processed such as soldering and plating.

(4) (I) Fluorine-containing resin mixture 70 to 95% by weight
  (a) Fluorine-containing resin
    Low molecular weight PTFE only or a mixture of low molecular weight PTFE with PFA or FEP
  (b) Thermoplastic resin
    PPS, PEEK, PI, PEI, PAI
    (a)/(b)=100/60 to 100/110 (weight ratio)
  (II) Specific whisker 5 to 30% by weight
  Aluminum borate whisker
  (III) Molded article
  Dielectric constant $\epsilon$: 3.5 or lower
  Coefficient of linear expansion: $2\times10^{-5}$/° C. to $3\times10^{-5}$/° C.
  Deflection temperature under load: 150° C. or higher
  (IV) Effect
  Low dielectric constant and excellent high frequency characteristics. The molded article has particularly high heat resisting temperature and deflection temperature under load and has excellent dimensional stability. Also various molding methods, particularly an injection molding method capable of precise molding can be employed.
  (V) Application
  Parts of various electronic and electrical equipment The molded article of the present invention is suitable for parts of various electronic and electrical equipment. Non-restricted examples of the application thereof are parts for semi-conductor such as a printed circuit board; casing members such as a housing of portable phone and terminal equipment for communications satellite; precisely processed parts such as connector, socket, coil bobbin and trimmer; high frequency filter, high frequency antenna (including antenna built in a housing, etc.), and the like.

Examples of the electronic and electrical equipment are usual light and heavy electrical appliances, precise electronic appliances, and the like. Among them, the molded article of the present invention are useful for parts of communications equipment, particularly communications equipment using high frequency wave band, such as portable phone, personal handy phone (PHS), beeper, terminal equipment for communications satellite, navigation system, equipment for broadcasting satellite, wireless LAN (local area network) system, automatic collision preventing system, and IC card. In addition, the molded article is useful for parts of general electric appliances such as electronic microwave range.

The present invention is then explained based on examples, but are not limited to them.

EXAMPLE 1

Pre-mixing of 40% by weight of PPS ("TOHPREN PPS" available from Tohpren Co., Ltd.) and 50% by weight of low molecular weight PTFE (DAIKIN POLYFLON PTFE LOW POLYMER available from DAIKIN INDUSTRIES, LTD., melt-viscosity at 380° C.: $10^5$ poises) was carried out with a mixer, and then 10% by weight of aluminum borate whisker ("ALBOREX" available from Shikoku Chemical Industries, Ltd.) was added to the mixture, followed by melt-kneading at a melting temperature of 280° to 320° C. with a two screw extruder (Model PCM46 available from Ikegai Tekko Kabushiki Kaisha) to give a resin composition of the present invention in the form of pellets.

The obtained pellets were subjected to injection molding at 270° to 320° C. of a cylinder temperature at 140° C. of a mold temperature by using an injection-molding machine (Model SG50 available from Sumitomo Heavy Industries, Ltd.) to give a test piece. The following characteristics of the test piece were measured. The results are shown in Table 1.

Characteristics Measured (Dielectric Constant and Dissipation Factor)

Measurement at a frequency of 1 MHz was made in accordance with JIS K6911 by using a microwave dielectric constant meter available from Microdevice Co., Ltd. Measurement at 12 GHz was made by non-destructive cavity resonance method.

(Deflection Temperature Under Load)

Measurement was made in accordance with ASTM D648 at a load of 18.6 Kg/cm$^2$ by using Heat Distortion Tester available from Yasuda Seiki Kabushiki Kaisha.

(Coefficient of Linear Expansion)

Measurement was made by compression load method at a load of 10 g at a temperature range of from room temperature to 150° C. by using thermal machine-aided analyzer (TMA) available from Rigaku Denki Kabushiki Kaisha.

(Mold Shrinkage)

Measurement was carried out in accordance with ASTM D955.

(Bending Strength and Modulus of Elasticity in Bending)

Measurement was carried out in accordance with ASTM D790 at a distance between the supporting points of 50 mm by using TENSILON Universal Tester available from Orientec Corporation.

(Moldability)

Injection-moldability was evaluated by using a bar flow test mold of an injection-molding machine (Conditions are mentioned below. Refer to International Publication WO96/14359.). Surface smoothness was evaluated by measuring surface roughness (arithmetic average roughness in accordance with JIS B0601) of a molded article. Anisotropic property was evaluated by a difference in shrinkage between the flow direction and the direction at a right angle to the flow direction of a molded article. From the overall evaluations mentioned above, moldability of the obtained molded article was evaluated. In Table 1, A represents "Excellent", B represents "Good", and C represents "Poor".

(Conditions for Injection Molding with a Bar Flow Test Mold)

Bar Flow Test Mold

Dimensions of cavity: 1 mm thick×20 mm wide

Gate: Film gate

Test Conditions of Injection Molding

Cylinder temperature: 320° to 400° C.

Temperature of nozzle section: 400° C.

Mold temperature: 200° C.

Injection pressure: 800 Kgf/cm$^2$

Rotating speed of screw: 150 rpm

Injection speed: 2 mm/sec, 5 mm/sec, 8 mm/sec or 12 mm/sec

EXAMPLE 2

The resin composition of the present invention was prepared in the same manner as in Example 1 except that a mixing amount of PPS, low molecular weight PTFE and aluminum borate whisker was changed as shown in Table 1, and further the mixture was injection-molded in the same manner as in Example 1 to give a test piece. The above-mentioned various characteristics were evaluated. The results are shown in Table 1.

Comparative Example 1

The resin composition for comparison was prepared in the same manner as in Example 1 except that aluminum borate whisker was not used and PPS and low molecular weight PTFE were mixed in a weight ratio of 50/50, and further the mixture was injection-molded in the same manner as in Example 1 to give a test piece. The above-mentioned various characteristics were evaluated. The results are shown in Table 1.

Comparative Example 2

The resin composition for comparison was prepared in the same manner as in Example 1 except that potassium titanate whisker was used instead of aluminum borate whisker, and further the mixture was injection-molded in the same manner as in Example 1 to give a test piece. The above-mentioned various characteristics were evaluated. The results are shown in Table 1.

Comparative Example 3

The resin composition for comparison was prepared in the same manner as in Example 1 except that E glass fiber (dielectric constant ∈: 7.0, average fiber length: 3 mm, average fiber diameter: 10 μm) was used instead of aluminum borate whisker, and further the mixture was injection-molded in the same manner as in Example 1 to give a test piece. The above-mentioned various characteristics were evaluated. The results are shown in Table 1.

TABLE 1

|  | Ex. 1 | Ex. 2 | Com. Ex. 1 | Com. Ex. 2 | Com. Ex. 3 |
|---|---|---|---|---|---|
| Components of resin composition (part by weight) | | | | | |
| Fluorine-containing resin (a) | | | | | |
| Low molecular weight PTFE | 50 | 40 | 50 | 50 | 50 |

TABLE 1-continued

|  | Ex. 1 | Ex. 2 | Com. Ex. 1 | Com. Ex. 2 | Com. Ex. 3 |
|---|---|---|---|---|---|
| Thermoplastic resin (b) | | | | | |
| PPS | 40 | 40 | 50 | 40 | 40 |
| Whisker (II) | | | | | |
| Aluminum borate whisker | 10 | 20 | — | — | — |
| Inorganic filler | | | | | |
| Potassium titanate whisker | — | — | — | 10 | — |
| E glass | — | — | — | — | 10 |
| Physical properties | | | | | |
| Dielectric constant ($\epsilon$) | | | | | |
| 1 MHz | 3.0 | 3.2 | 2.9 | 4.9 | — |
| 12 GHz | Not measured | Not measured | 2.3 | — | — |
| Dissipation factor (tan$\delta$) | | | | | |
| 1 MHz | 0.001 | 0.001 | 0.001 | 0.079 | — |
| Deflection temperature under load (° C.) | 160 | 210 | 110 | 140 | 250 |
| Coefficient of linear expansion ($\times 10^{-5}$/° C.) | 2.4 | 2.0 | 3.9 | 2.9 | 2.1 |
| Mold shrinkage (%) | | | | | |
| Flow direction | 0.6 | 0.3 | 1.4 | 0.9 | 0.3 |
| Direction at a right angle to flow direction | 1.9 | 1.6 | 1.7 | 1.7 | 1.8 |
| Bending strength (Mpa) | 65 | 91 | — | 60 | 87 |
| Modulus of elasticity in bending (MPa) | 1400 | 8000 | — | 3800 | 5000 |
| Moldability (overall evaluation) | A | A | A | A | C |
| Injection-moldability | A | A | A | A | B |
| Surface smoothness | A | A | A | A | C |
| Anisotropic property | A | B | A | A | B |

As shown in Table 1, if the whisker is not added, while a molded article having a low dielectric constant can be obtained, a deflection temperature under load is low and heat expansion becomes large (Comparative Example 1); if potassium titanate whisker is used, a dielectric constant becomes high (Comparative Example 2); and if E glass is used, moldability is lowered (Comparative Example 3). On the contrary, it is seen well that in the composition of the present invention, dielectric property, heat resistance, mechanical properties and processability are well-balanced and enhanced as desired.

The present invention can provide a fluorine-containing resin composition useful as a molding material for parts of electronic and electrical equipment which assures well-balanced enhancement of dielectric property, heat resistance, mold-processability (precise processability) and mechanical properties.

What is claimed is:

1. A fluorine-containing resin composition for parts of electronic and electrical equipment which comprises 70 to 95% by weight of (I) fluorine-containing resin mixture comprising (a) a fluorine-containing resin containing polytetrafluoroethylene not to be fibrillated and (b) a thermoplastic resin other than the fluorine-containing resin and 5 to 30% by weight of (II) a metal compound whisker having a single bond strength of not less than 190 KJ/mol calculated from a dissociation energy of bond between a metal element and oxygen.

said polytetrafluoroethylene not to be fibrillated is a low molecular weight polytetrafluoroethylene particle or a particle having a core-shell structure, in which the shell comprises low molecular weight polytetrafluoroethylene and the core comprises high molecular weight polytetrafluoroethylene.

2. The resin composition of claim 1, wherein the fluorine-containing resin (a) is polytetrafluoroethylene not to be fibrillated or a mixture of polytetrafluoroethylene not to be fibrillated and other fluorine-containing meltable resin.

3. The resin composition of claim 2, wherein the other fluorine-containing meltable resin has a dielectric constant (1 MHz) of not more than 2.5.

4. The resin composition of claim 3, wherein the other fluorine-containing meltable resin is at least one of tetrafluoroethylene-hexafluoropropylene copolymer, tetrafluoroethylene-perfluoro(alkyl vinyl ether) copolymer or polychlorotrifluoroethylene.

5. The resin composition of claim 1, wherein the thermoplastic resin (b) is at least one of polyarylene sulfide, polyether ether ketone, polyimide, polyetherimide or polyamide imide.

6. The resin composition of claim 1, wherein the whisker (II) is an aluminum borate whisker.

7. The resin composition of claim 1, wherein the fluorine-containing resin mixture (I) contains 60 to 110 parts by weight of thermoplastic resin (b) other than the fluorine-containing resin based on 100 parts by weight of fluorine-containing resin (a).

8. The resin composition of claim 1, which comprises 80 to 95% by weight of the fluorine-containing resin mixture (I) and 5 to 20% by weight of the whisker (II).

9. The resin composition of claim 1, which can be injection-molded.

10. The resin composition of claim 1, which is a molding material for parts of electronic and electrical equipment using a high frequency wave.

11. Parts of electronic and electrical equipment which are molded articles obtained by molding the resin composition of claim 1.

12. Parts of electronic and electrical equipment which are molded articles comprising 70 to 95% by weight of (I) fluorine-containing resin mixture comprising (a) a fluorine-containing resin containing polytetrafluoroethylene not to be fibrillated and (b) a thermoplastic resin other than the fluorine-containing resin and 5 to 30% by weight of (II) a metal compound whisker having a single bond strength of not less than 190 Kj/mol calculated from a dissociation energy of bond between a metal element and oxygen; said thermoplastic resin (b) forming a matrix, in which the fluorine-containing resin (a) and the whisker (II) are dispersed uniformly, and a dielectric constant of the whole molded articles being not more than 3.5, said polytetrafluoroethylene not to be fibrillated is a low molecular weight polytetrafluoroethylene particle or a particle having a core-shell structure, in which the shell comprises low molecular weight polytetrafluoroethylene and the core comprises high molecular weight polytetrafluoroethylene.

13. Parts of claim 12, wherein a coefficient of linear expansion of the molded articles is from $2\times10^{-5}/°$ C. to $3\times10^{-5}/°$ C.

14. Parts of claim 12, wherein a deflection temperature under load of the molded articles is not less than 150° C.

15. Parts of claim 12, wherein the molded articles comprise 85 to 95% by weight of the fluorine-containing resin mixture (I) and 5 to 15% by weight of the whisker (II) and a dielectric constant of the molded articles is not more than 3.0.

16. Parts of claim 12, wherein a deflection temperature under under load of the molded articles is not less than 200° C.

17. Parts of claim 12, wherein the molded articles are precise parts obtained by injection molding.

18. Parts of claim 12, which are for electronic and electrical equipment using a high frequency wave.

* * * * *